Patented July 1, 1930

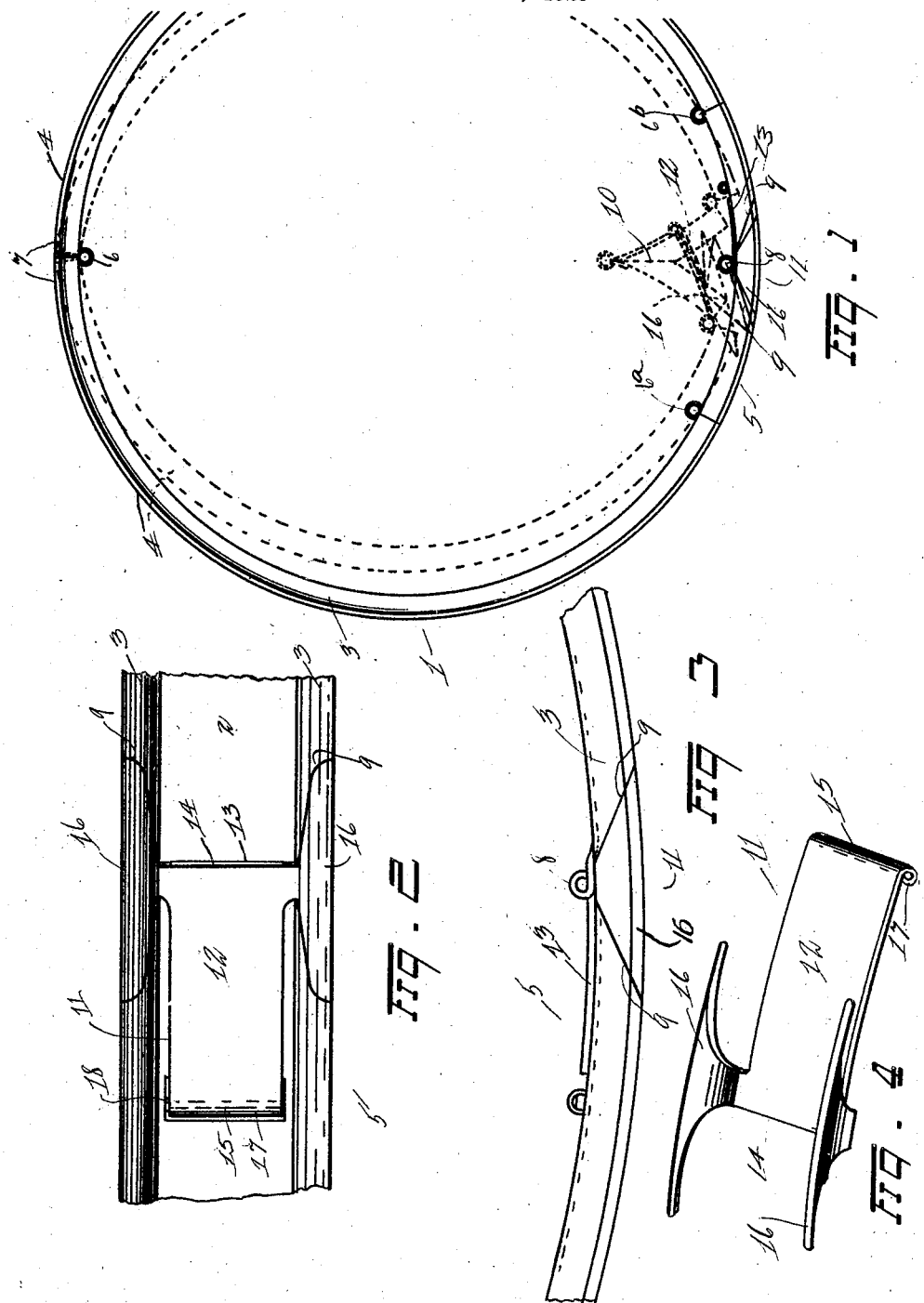

1,769,097

UNITED STATES PATENT OFFICE

WILLIAM H. BAIRD AND THOMAS O. BAIRD, OF GRANDVIEW, WASHINGTON

TIRE RIM

Application filed January 28, 1929. Serial No. 335,646.

This invention relates to tire rims and has as one of its objects to provide a rim that will give full protection to a tire and its tube and also protect the valve stem from wear.

Another object of the invention is to provide a rim that will easily receive a tire without danger of puncturing the tube and that will prevent the flap from being dislodged while assembling the tire on the rim with its attendant liability of subsequently pinching the tube after assembly.

A further object of the invention is to provide a rim that may be readily collapsed when the tire is deflated, for removal of the tire, and that cannot collapse as long as pressure exists from the tire, or while it is on the wheel.

A further object of the invention is to provide a rim that needs no tools to place or remove a tire and hence that will always keep its shape.

A further object of the invention is to provide a rim that is self locking, that has no loose parts, and that is quicker and easier to change tires on.

With these and other objects in view reference is had to the accompanying drawings in which Fig. 1 is a side elevation of a fragment of a rim showing its construction;

Fig. 2 is a plan view, looking toward the center of its circle of a fragment of a rim enlarged, showing the position of the guard in place therein;

Fig. 3 is an enlarged side elevation of a fragment of a rim showing the relative positioning of the wings of the guard, and the side walls, when the rim is expanded, and Fig. 4 is a perspective view of the guard, in a reverse position to that shown in Fig. 2.

Having reference to the drawings like numerals refer to like parts throughout the several views, and the numeral 1 refers to the rim assembly which consists of a channel section opening outward and containing a flat base 2 with the edges turned perpendicular to the base and given an outward roll to provide side-walls 3 for the purpose of engaging a tire (not shown).

It is well known that a tire casing (not shown) has a fixed internal diameter, and that this diameter is such that it will fit comfortably upon the base 2 of the rim 1 adjacent to the side-walls 3 and that it requires considerable effort and forcible stretching of the casings in small tires, and that it is almost impossible in large tires to force a casing over the side-walls of the rim to remove or replace the tire thereon if the rim is solid.

It is also well known that where a rim is broken at a single place that the rim requires considerable effort and manipulation both to break the joint and to remove the rim from the tire, particularly when the tire has been on the rim a certain length of time when it becomes adhered thereto adding greater difficulties against its removal.

From the above it is now obvious that to render the removal or replacement of a tire an easy matter it is necessary that the casing be capable of expansion or that the rim be capable of contraction, and as the first is impracticable, the rim herewith shown is devised for the purpose of receiving the tire by contraction.

The rim consists of two major sections 4 and a collapsible section 5, as shown in Fig. 1, and these sections are joined together at their ends with hinges 6, 6ª and 6ᵇ, preferably formed integral with the rim sections for the purpose that there will be no loose parts that might become lost thereby rendering the rim unfit for use.

By again referring to Fig. 1 the fact will be noted that the major sections 4 are joined together at their upper ends 7 in a manner to permit the rim to contract from this point, and that these major sections constitute two thirds or more of the complete rim, and that the collapsible section 5 completes the rim and is therefore of a length less than one third of the circumference of the circle.

This collapsible section 5 is provided with a central hinge 8 which is adapted to move in a direction opposite to the hinges 6, 6ª and 6ᵇ above mentioned, and that the sidewalls may not interfere with this movement, they are notched, as at 9, to permit the collapsible section to fold within the circle, i. e. inside the rim.

It is now obvious that the collapsible section shall be of sufficient length over all as to contract the whole rim sufficiently to enable it to completely release the casing of the tire and hence that this section may be less than one third of the total circumference.

The notches mentioned as occurring in the side-walls of the collapsible section have the simplest form of mutilation in the nature of a straight cut in a diagonal line in each adjacent segment and diverging outward from a point on each side of the center of the hinge 8, and this provides a wedge shaped notch 9 the sides 10 of which come together when the collapsible section 5 is folded into the rim, and thus provides a stop to control the movement of this section in this direction.

It is obvious that this notch 9 must be closed to prevent the tire blowing out at this point and for the purpose of closing the notch a guard 11 is provided which is mounted in the concavity of the rim and which consists of a plate 12 hinged to the base 2 and seated in a depression 13 formed in the base of the rim so that the top of this plate is level with the corresponding surface of the remainder of the rim, to present a smooth surface to prevent chafing of the inner tube, and the end 14 of this plate opposite the hinged end 15 is extended to lap over the hinge and joint, to seat in a smaller depression provided in the adjacent segment and is provided with wedge shaped sides or wings 16 adapted to fit into the notches 9 of the collapsible section when the rim is expanded.

By referring to the drawings it will be noted that the hinged mounting of the guard consists of a circle 17 formed on the end 15 opposite the wings 16 which circle is secured about a cross bar 18 formed in the base of the rim, and that the length of the plate 12 is such as to permit the wings to move in an arc, about this bar as a center, and in such a manner as to raise or lower the wings outward from or into the wedge shaped notch 9 of the side-walls 3, and it will be further noted that by virtue of the wedge shape of the notch that the act of folding the collapsible section will close the opposite edges of the notches together thereby automatically forcing the wings out of the notches, the guard then assuming the position shown by the dotted lines in Fig. 1, where it will remain until the tire is placed on the rim for assembly.

It is further obvious that with the tire on the rim that as the rim is expanded to fit the casing, the casing, acting in conjunction with the moving collapsible section, will automatically restore the guard 11 to its normal position of closing the notches, the guard anticipating the engagement of the tire by the section, and it is further obvious that with the rim expanded to its full size that upon inflation of the tire it will be impossible to move the guard from its seat in the notches, against the pressure of the tire, and therefore that the rim may be considered as being air locked into a rigid whole; and further that when the rim is placed on the wheel that there can be no possibility of the rim accidentally contracting.

As tires consisting of tubes and casings, and the attendant wheels using such tires are old in the art, it is deemed unnecessary that they be illustrated and hence drawings of these parts are omitted.

In use and to remove a deflated tire the collapsible section is placed toward the ground, or some solid object, and the tire and rim is then struck sharply against the object to overcome the spring of the rim when the collapsible section will be folded into the rim and the guard automatically removed from the notches, as the section recedes, the guard operating with less movement than the parent segment due to their relative lengths, when the casing may be released therefrom.

The rim is now lifted out of the casing and this latter will be repaired or replaced and when the tire is again upon the rim and the tire flap placed, pressure of the foot upon the apex of the folded section will expand and fit the rim into the tire, when upon inflation, the rim will be locked into the assembled position in the manner above explained.

By this means and arrangement of the parts it is obvious that tools are unnecessary for the removal or replacement of the tire and that without the use of tools the danger of pinching the inner tube is entirely removed, and the danger of creating a wrinkle in the flap which might eventually chafe the inner tube and cause it to leak, is also removed.

Having thus described our invention, we claim—

A collapsible rim having side-walls forming a channel section and consisting of two major sections hingedly united, and a third section hingedly attached to the major sections to complete the circle, said third section comprising a pair of members centrally and hingedly united and provided with wedge shaped notches in the side-walls, at the hinge joint, to fold inward and to reduce the circumference of said rim, a depression formed in the channel in one of said members adjacent the hinge joint, a guard hingedly attached to and movable with one of said members to register with and normally seat in said depression, said guard having wedge shaped wings adapted to seat in said notches, said wings being adapted for automatic movement into and out of engagement with the notches by virtue of its wedge shape and to be automatically secured in said notches upon the inflation of the tire.

In testimony whereof we affix our signatures.

WILLIAM H. BAIRD.
THOMAS O. BAIRD.